3,129,134
SILICEOUS PIGMENTS
Gosta B. Lagerstrom, Clinton, Ohio, assignor to Pittsburgh Plate Glass Company, Pittsburgh, Pa., a corporation of Pennsylvania
No Drawing. Filed Mar. 21, 1961, Ser. No. 97,177
18 Claims. (Cl. 162—181)

This invention relates to unique valuable siliceous pigments, their manufacture and use. It more particularly concerns finely divided precipitated siliceous pigments which, among other things, are notable because of their effectiveness in enhancing optical properties of paper.

There are now provided, in accordance with this invention, finely divided flocculated amorphous siliceous pigments. These pigments are flocculated, e.g., in the form of flocs or agglomerates of quite small ultimate particles of siliceous material. Their average ultimate particle size is below about 0.5 micron in diameter, and preferably less than about 0.3 micron (rarely, however, less than 0.01 micron). A multiplicity of these small ultimate particles are agglomerated or aggregated together without complete loss of their individual identities, providing for the pigment's flocculated state. Flocs range up to 20 or even 40 microns in size (measured at their longest dimension).

The degree to which these flocs persist (are not degraded into smaller flocs) when the pigment is subjected to mechanical action, i.e., grinding, varies. Even with those pigments which may have their average floc size altered by mechanical means such as grinding, the flocculent characteristics of the contemplated pigments persist.

This flocculated state is clearly observable under high magnification. Under the magnification of an electron microscope, the pigment appears predominantly in the form of three-dimensional clusters. These clusters (or flocs) may be likened to grape bunches in which the ultimate particles in the floc are denoted by individual grapes and the floc is represented by the cluster. Often, the forces which agglomerate the individual ultimate particles into flocs are so great that the flocs themselves evidence considerable resistance to degradation into their ultimate particles even under intense mechanical grinding such as micropulverization. With pigment flocs usually in the range of 1 to 10 microns in size, this resistance to degradation even into smaller flocs is particularly pronounced.

A unique feataure of the contemplated pigments is the character of a material portion of their ultimate particles. These unique ultimate particles in the contemplated pigments are composed of an optically dense outer shell (shell-like structure) of siliceous material. The interior volume enclosed or within the shell is of much lower optical density, e.g., below the optical density of water insoluble precipitated siliceous material. Under the high magnification of an electron microscope, such ultimate particles appear almost bubble-like and spheroidal with the difference in optical density between the inner and outer volumes giving them the appearance of hollow particles.

The optical density of the interior volumes of the ultimate particles is below the optical density of water insoluble siliceous materials which comprise the contemplated siliceous pigments. Better pigments are characterized by ultimate particles having an outer shell of water insoluble precipitated amorphous siliceous material enclosing an interior volume substantially free of water insoluble siliceous material, and usually substantially free of water insoluble solid materials. Fluids, i.e., gases or liquids, may occupy these interior volumes, the dimensions of which are defined by the inner surface of the ultimate particle's siliceous shell. When well dried, little if any liquid such as water normally occupies or fills these interiors.

Siliceous pigments comprised of ultimate particles having a considerable interior volume substantially free of water insoluble siliceous material are herein especially useful, for example, in enhancing the optical properties of paper. With essentially spheroidal ultimate particles, the thickness of the water insoluble siliceous shell is between about $\frac{1}{20}$ and $\frac{1}{4}$ of the ultimate particle's diameter. Thus, the ratio of the particle's outer diameter to the difference in outer diameter and inner diameter varies from 2 and 10 to 1, the outer diameter being the diameter of the sphere encompassed by the outer surface of the ultimate particle and the inner diameter being the diameter of the spheroidal volume encompassed by the inner surface of dense or water insoluble siliceous material (or, in other words, the diameter of the interior volume of low optical density).

Shell thicknesses of water insoluble precipitated siliceous material range typically from about 0.001 micron to about 0.15 micron. With ultimate particles of 0.5 micron diameter, shell thicknesses most frequently vary between 0.05 to 0.125 micron. Smaller ultimate particles are generally characterized by somewhat thinner shells. For example, the shells of 0.05 micron size ultimate particles are 0.005 to 0.125 micron in thickness.

These ultimate particles are not easily disintegrated by mechanical grinding, the shell or skin structure being structurally sufficient to resist such degradation. At least, the shells are not readily or significantly fractured mechanically, for example, by micropulverization. Thus, under conditions of use in paper, their characteristic shell structure is not seriously or noticeably disintegrated.

As a rule, the shell does not enclose or encase completely the less optically dense interiors. Interiors are thus not isolated completely but only partially separated from the environment by the shell or skin. That is, the shell is discontinuous rather than continuous at least to the extent that when the interior volume is fluid (gas or liquid) it is possible to remove or replace the fluid. For example, when the interior is gaseous, the interior volume will assume a gas composition approximately that of the ambient atmosphere. Moreover, upon drying thermally, it is possible to remove water which may be present in the pores (interiors).

After preparation in accordance with the methods hereinafter described as an aqueous slurry, the pigments are recovered and dried. Thus, as normally manufactured, they are white, fluffy, pulverulent and dry to the touch. Despite appearing dry, these pigments normally contain water.

Water associated with these pigments is of two types. One is "free water" which is that water which is removed from the pigment by heating at 105° C. for 24 hours in a laboratory oven. They also contain "bound water" which refers to that water removed by heating at ignition temperature, 1000° C. to 1200° C., for an extended period of time, e.g., 24 hours, less the pigment's free water content. Apparently, the bound water is chemically associated with the composition. Usually the free water content range is from about 2 to 15, more notably 2 to 8, percent by weight of the composition while the bound water constitutes between about 2 and 10 weight percent of the composition.

Chemically, these siliceous pigments have a substantial $SiO_2$ content, usually at least 50 percent by weight $SiO_2$ on an anhydrous basis. Also commonly present are one or more metals usually as their metal oxides, including frequently an alkaline earth metal oxide such as calcium oxide. It is not entirely understood whether the $SiO_2$ and other metal oxide or oxides such as alkaline earth metal oxide are present as an intimate physical mixture or as an alkaline earth metal silicate having a high mole ratio of $SiO_2$ to metal oxide. Most of the metal oxide-$SiO_2$ pigments can be chemically represented, on an anhydrous basis, as $MO(SiO_2)_x$, where M is a metal or metals and $x$ is a value from 5 to 25 or even higher, including fractional values, and preferably 5 to 15.

Many of the pigments contain a substantial alkaline earth metal content. For certain purposes, such as the use of the pigments in paper, those containing calcium probably as calcium oxide are advantageous. On a dry basis (normal amounts of free and bound water present) the calcium content on a calcium oxide basis is from about 3 to 15, or 5 to 10, weight percent of the composition.

One or more other metals are also often present, although primarily in minor concentrations of from 0.1 up to about 6 weight percent (measured as their oxides) of the dry composition. Iron, aluminum and sodium, among others, are illustrative metals. In many instances, the presence of these metals in these concentrations serve useful ends.

Pigments herein contemplated are useful for a wide diversity of applications. They are effective paper pigments, being most effective for enhancing optical properties such as opacity when dispersed in paper. They serve as reinforcing pigments for natural and synthetic rubbers. They may be used as inert carriers in the preparation of solid compositions of agricultural chemicals such as DDT.

In accordance with this invention, these siliceous pigments may be produced by precipitating water insoluble siliceous product from aqueous siliceous solution in the presence of a water insoluble salt, especially inorganic salts of those acids the anhydride of which is normally gaseous (e.g., the inorganic salts of carbonic acid exemplified by calcium carbonate). This generates an aqueous slurry of water insoluble siliceous precipitate. The water insoluble salt is then removed, e.g., converted to water soluble salt. Acid, notably an acid which is reactive with the salt in the slurry, is mixed with such slurry.

In most instances, this acid addition involves reaction with the salt (apparently contained in admixture with the precipitated siliceous material). This converts the cation of the salt into a water soluble salt of the acid and liberates the anion of the salt as the anhydride corresponding to the acid from which the salt is derived. Thus, with calcium carbonate in the slurry and treatment with hydrochloric acid, calcium chloride is produced and carbon dioxide (or carbonic acid) evolved. In aqueous media, the liberated anhydride usually at least partially dissolves in the aqueous media. Consequently, the siliceous slurry may have present to the extent of their solubility (or equilibrium) aqueous solutions of the acid rather than anhydride.

For the pigmentation of paper especially to achieve enhancement of optical properties, the herein contemplated pigments preferably are those having an average ultimate particle diameter size of from 0.05 to 0.2 or 0.25 micron. Finer particle size pigments, e.g., pigments having an average ultimate particle size of 0.001 to 0.03, are generally better suited for reinforcement of natural and synthetic rubbers.

In accordance with an embodiment of this invention, siliceous pigments providing most noteworthy effects in paper (especially for enhancing optical properties such as opacity) are prepared by precipitating siliceous pigment in a slurry of finely divided water insoluble carbonate salt, notably calcium carbonate. The particle size of the calcium carbonate or like water insoluble salt of carbonic acid in the slurry should preferably approximate the desired ultimate particle size of the siliceous pigment. At least in a preferred procedure, calcium carbonate of this desired particle size is effectively slurried in water to provide the medium in which siliceous precipitation is accomplished. Typically, finely divided calcium carbonate of a particle size somewhat smaller than the average ultimate particle size of the desired siliceous pigment is employed. For example, the preparation of a siliceous pigment having an average ultimate particle diameter size of about 0.15 micron entails conducting the precipitation of siliceous material in a slurry of calcium carbonate having an average particle diameter size on the order of about 0.1 micron. Thus, depending on the desired ultimate particle size of the pigment, calcium carbonate of from about 0.01 to 0.25 or up to 0.45 micron is employed.

From physical characteristics of the ultimate pigment (the deficiency of water insoluble siliceous material in the core of the ultimate particles) the foregoing method apparently precipitates water insoluble siliceous material upon the surface of finely divided water insoluble calcium carbonate particles. In the method this carbonate is converted, as by acidification, to water soluble components.

The manner of precipitating the siliceous material from solution (in the slurry of calcium carbonate or like insoluble salt) is important. Exemplary pigments are those prepared by a process which includes inducing with a metal salt precipitation of the siliceous component from an aqueous siliceous solution which in itself would normally tend to precipitate siliceous material. For example, an aqueous solution of sodium silicate (or like alkali metal silicate) is partially neutralized with hydrochloric acid (or like neutralizing agent) to an extent such that the resulting aqueous media will upon standing, sometimes for but very brief duration, deposit from solution water insoluble siliceous material. Prior to the manifestation by such aqueous siliceous media of its metastable state and tendency to develop siliceous precipitate, precipitation of the pigmentary siliceous material is induced by a metal salt such as calcium chloride. Thus, the water insoluble siliceous component is precipitated by distributing calcium chloride or like metal salt in an aqueous medium containing dissolved alkali metal silicate in which the mole ratio of $SiO_2$ to alkali metal oxide is greater than that of water soluble alkali metal silicates, usually greater than 6 moles of $SiO_2$ per mole of $Na_2O$.

There are various expedients for providing these appropriate conditions of precipitation. One effective procedure partially neutralizes an aqueous sodium silicate solution with an acid such as hydrochloric acid to provide an aqueous siliceous solution containing at least 6 moles of $SiO_2$ per mole of $Na_2O$, usually no more than 10 or 12 moles $SiO_2$ per mole of $Na_2O$ or like alkali metal oxide. For example, an aqueous solution of a sodium silicate containing about 3.3 moles of $SiO_2$ per mole of $Na_2O$ is mixed with sufficient hydrochloric acid to react with about half the $Na_2O$. This results in an aqueous medium containing approximately 6.6 moles of $SiO_2$ per mole of $Na_2O$. Upon standing, such aqueous siliceous medium will develop siliceous precipitate.

In the contemplated procedure, this siliceous solution prior to development of an irreversible water insoluble siliceous precipitate is mixed effectively with a metal salt such as calcium chloride. This salt induces precipitation from solution of water insoluble siliceous material. It is best to insure that the salt induced precipitation is achieved before formation of water insoluble irreversible siliceous precipitate (occasioned by the metastable condition of the solution). To attain these conditions, adherence to several principles is recommended.

First of all, partial neutralization with acid (or neutralizing agent) of aqueous solution of sodium silicate or like alkali metal silicate should be accomplished while avoiding localized high acid concentrations. This is done by mixing the respective reagents under conditions of high turbulence to form promptly a homogeneous medium. Mixing under dilute reagent conditions and low temperatures are also favorable. Thus, the partial neutralization and formation of siliceous solution is readily accomplished at from 0° C. to 40° C., although higher temperatures, e.g., 50° C., are permissive.

It is also sound practice to distribute promptly thereafter a metal salt such as calcium chloride uniformly throughout the partially neutralized siliceous solution. Good practices involve distributing the metal salt either simultaneously with or immediately after provision of the partially neutralized solution, lest formation commence of undesirable water insoluble siliceous materials. Tolerable time lapses between salt induced precipitation and formation of the siliceous solution often are but a fraction of a second, i.e., 0.1 to 0.5 second. By using extremely dilute solutions, e.g., solutions containing less than about 5 grams per liter $Na_2O$ and by maintaining the solutions at relatively low temperatures, usually below 20° C., permissible time periods may be somewhat longer and include periods of possibly 10 or 15 minutes.

It is also recommended that the aqueous sodium silicate or like alkali metal silicate solution be diluted from $Na_2O$ contents of 30 grams $Na_2O$ per liter to appropriate concentration, e.g., less than 15 grams $Na_2O$ per liter, immediately prior to its partial neutralization.

The following examples illustrate the manner in which the present invention may be practiced:

EXAMPLE I

An aqueous solution of sodium silicate

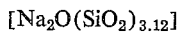
$$[Na_2O(SiO_2)_{3.12}]$$

containing 10.5 grams per liter $Na_2O$ was fed at the rate of 0.5 liter per minute to one arm of a T tube. To the other arm of the T tube, 0.5 liter per minute of an aqueous solution of hydrochloric acid at 25° C. containing 6.8 grams per liter HCl was fed. The T tube arms and leg were $3/16$ of an inch in inner diameter. At the juncture of the arms and leg, the T was filled with a lead base alloy through which $1/16$ inch diameter holes were bored. Thus, in the $1/16$ inch bores within this T tube, the aqueous sodium silicate solution was mixed promptly and effectively with hydrochloric acid to form a partially neutralized siliceous solution.

After being so formed, the aqueous siliceous solution was discharged promptly (calculated time before contact with the tank contents being about 0.13 second) from the T tube leg into a cylindrical tank 130 millimeters high and 150 millimeters in diameter. Two 180 degree spaced baffles 80 millimeters high and 50 millimeters wide were anchored to the bottom and side of the tank in a vertical plane passing through the major vertical axis of the tank. During the process, the contents of the tank were agitated by rotating at 1200 revolutions per minute an electric driven stirrer having its drive axis disposed along the major vertical axis of the tank terminating in a two-blade propeller, the lowermost surfaces of which were spaced 10 millimeters above the tank bottom.

Added simultaneously to this tank through a pipe having an inner diameter of 4 millimeters was 1 liter per minute of an aqueous stream at 25° C. containing 18.8 grams per liter calcium chloride and 57 grams per liter calcium carbonate. This stream was prepared by mixing with a slurry provided by homogenizing 400 grams of calcium carbonate having an average ultimate particle size of 0.1 micron in 3.5 liters of water with 3.5 liters of an aqueous solution of calcium chloride containing 131.5 grams of calcium chloride.

By this procedure, water insoluble siliceous pigment was precipitated from the aqueous siliceous solution in the cylindrical tank. Product slurry was continuously withdrawn from the tank through two 180 degree spaced 20 millimeter diameter holes in the tank, the lowest point of each hole being 65 millimeters above the tank bottom. The liquid volume in the tank was about 1 liter and retention times were on the order of about 20 to 30 seconds.

This withdrawn slurry was thereafter treated with sufficient hydrochloric acid to reduce it to between 1.5 and 2 pH. This was done by adding hydrochloric acid to the slurry and agitating the resulting mixture at room temperature for from 10 to 15 minutes. Thereafter, sufficient sodium hydroxide was added to raise the slurry pH to 7.5.

This slurry was then heated to a temperature of 100° C. for 6 to 14 hours, filtered, dried and milled in a Mikropulverizer (a hammer mill). The pigment is a white, pulverulent, amorphous, finely divided, siliceous product.

An identifying characteristic of this pigment (especially by comparison with the siliceous material obtained from the precipitation tank prior to acidification to 1.5 to 2.0 pH) is the predominance of ultimate particles having interiors which are substantially less dense optically than their outer peripheries or shell. This characteristic is quite noticeable in photomicrographs of the pigment under high magnification (e.g., under the electron microscope). The average ultimate particle size of these pigments is somewhat greater than 0.1 micron, about 0.15 to 0.2 micron.

The paper pigmenting qualities of the product produced in Example I were demonstrated by preparing paper according to the following example:

EXAMPLE II

Seven liters of an aqueous pulp slurry containing 2 percent pulp by weight (140 grams of pulp dry basis) was beaten to 400 milliliters freeness (Canadian standard).

A 300 cubic centimeter portion of an aqueous slurry containing 14 grams of the pigment produced in Example I was mixed with this prepared pulp for 5 minutes. Then, sufficient $Al_2(SO_4)_3 \cdot 18H_2O$ was added to adjust the slurry and white water to about pH 5. This pulp was sheeted on a laboratory Noble-Wood sheeting machine and representative sheets of the respective runs were tested to evaluate their ash content, opacity and brightness.

Paper produced in this fashion had an ash of 6.3 percent by weight, an opacity percent of 83.5 and a brightness percent of 86.1. Its Spig calculated on a 7 weight percent ash basis from this data was 0.57.

EXAMPLE III

Siliceous pigment was prepared in the manner described in Example I with the exception that the calcium carbonate-calcium chloride solution fed to the cylindrical reaction tank also contained 7.5 grams per liter sodium chloride. This sodium chloride content was provided by admixing 157 grams of sodium chloride along with the calcium chloride and calcium carbonate to form 21 liters of the solution which was added to the cylindrical precipitation tank.

The performance of pigment produced in accordance with Example III in improving the optical properties of paper was demonstrated by the following example:

EXAMPLE IV

Paper was prepared following the procedure of Example II using the pigment of Example III and the various properties of the paper measured. For runs 2, 3 and 4, the same procedure for preparing and sheeting paper was followed but the amount of pigment present in the 300 cubic centimeter portion was 7 grams for run 2, 3.5 grams for run 3, and 1.4 grams for run 4. Table I presents the data:

Table I

| Run | Ash Weight, Percent | Opacity, Percent | Brightness, Percent | Spig | $(S-\bar{s}) \times 10^4$ |
|---|---|---|---|---|---|
| 1 | 7.2 | 84.6 | 88.0 | 0.60 | 463 |
| 2 | 3.9 | 81.2 | 85.8 | * | 284 |
| 3 | 2.1 | 77.7 | 84.1 | * | 169 |
| 4 | 1.0 | 73.2 | 81.2 | * | 67 |

* In Runs 2 through 4, the ash is regarded as too low for the Spig value to be meaningful.

This data demonstrates the particular effectiveness with which these pigments enhance the optical properties of paper. Of particular note is their striking effectiveness when used in amounts between 0.5 and 5 percent by weight of the pulp (dry basis of the pulp). At these low pigment loadings in paper, optical properties of paper are at least comparable to those achieved employing equivalent amounts by weight of paper grade titanium dioxide.

Herein contemplated pigments, moreover, not only are remarkably effective opacifying pigments for paper when used as the sole or principal pigment for improving optical properties, but are extremely effective when used in conjunction with paper pigment grade titanium dioxide. The following example illustrates the notable effects achieved using the herein contemplated pigments along with titanium dioxide to improve the optical properties of paper:

EXAMPLE V

The procedure employed in Example II was followed with the exception that the type of pigment and amount present in the 300 cubic centimeter slurry was varied as indicated in Table II, the titanium dioxide used being pigment grade and the siliceous pigment being that produced by the procedure of Example I.

Table II

| Run | Ash Weight, Percent | Opacity, Percent | Brightness, Percent | Spig | $(S-\bar{s}) \times 10^4$ | Gram Pigment Used | |
|---|---|---|---|---|---|---|---|
| | | | | | | TiO$_2$ | Siliceous |
| 1 | 7.7 | 89.0 | 87.7 | 0.87 | 698 | 7 | 7 |
| 2 | 7.0 | 87.3 | 89.8 | 0.88 | 627 | 5.6 | 5.6 |
| 3 | 8.6 | 87.8 | 89.6 | 0.78 | 649 | 14 | |
| 4 | 7.1 | 85.7 | 88.9 | 0.79 | 543 | 11.2 | |

In lieu of adding calcium carbonate or like water insoluble salts directly to the medium in which precipitation of the siliceous pigment occurs, the calcium carbonate may in effect be generated in situ. For example, a water soluble carbonate such as sodium carbonate or other source of carbonate ion may be fed to the precipitation tank along with calcium chloride or other water soluble calcium salt providing calcium ions in the preparation of contemplated pigments. Apparently, the respective ions in effect react to form calcium carbonate. From the nature of the siliceous pigments stemming from such procedure, it appears that insoluble calcium carbonate is provided by this procedure upon which insoluble siliceous materials precipitate. Generally, it has been observed that pigments produced in which water soluble carbonates are fed to the precipitation zone are smaller in ultimate particle size than those obtained using water insoluble carbonate salts.

The following example illustrates one such method in which solutions of sodium carbonate and calcium chloride are independently added to the precipitation tank:

EXAMPLE VI

The general procedure and equipment described in Example I were employed except that (a) 0.5 liter per minute of a calcium chloride solution containing no calcium carbonate and (b) 0.5 liter per minute of a further stream of aqueous sodium carbonate were added to the precipitation tank in a series of runs using varying reagent concentrations.

The following table lists the particular reagent concentrations employed in various runs:

Table III

| Run | Sodium Silicate Na$_2$O, g.p.l.* | HCl, g.p.l.* | Chloride Solution | | Na$_2$CO$_3$, g.p.l.* |
|---|---|---|---|---|---|
| | | | CaCl$_2$, g.p.l.* | NaCl, g.p.l.* | |
| 1 | 30 | 17.7 | 107 | 43 | 25.6 |
| 2 | 30 | 17.7 | 107 | 43 | 51.2 |
| 3 | 15 | 7.92 | 26.9 | 10.75 | 6.4 |
| 4 | 15 | 7.92 | 26.9 | 10.75 | 19.2 |
| 5 | 15 | 7.92 | 80.7 | 32.25 | 6.4 |
| 6 | 15 | 7.92 | 80.7 | 32.25 | 19.2 |
| 7 | 15 | 9.69 | 26.9 | 10.75 | 6.4 |
| 8 | 15 | 9.69 | 26.9 | 10.75 | 19.2 |
| 9 | 15 | 9.69 | 80.7 | 32.25 | 6.4 |
| 10 | 15 | 9.69 | 80.7 | 32.25 | 19.2 |
| 11 | 30 | 15.84 | 53.8 | 21.5 | 12.8 |
| 12 | 30 | 15.84 | 53.8 | 21.5 | 38.4 |
| 13 | 30 | 15.84 | 161.4 | 64.5 | 12.8 |
| 14 | 30 | 15.84 | 161.4 | 64.5 | 38.4 |
| 15 | 30 | 19.38 | 53.8 | 21.5 | 12.8 |
| 16 | 30 | 19.38 | 53.8 | 21.5 | 38.4 |
| 17 | 30 | 19.38 | 161.4 | 64.5 | 12.8 |
| 18 | 30 | 19.38 | 161.4 | 64.5 | 38.4 |
| 19 | 20 | 11.8 | 53.6 | 21.4 | 8.55 |
| 20 | 20 | 15.3 | 53.6 | 21.4 | 8.55 |
| 21 | 20 | 18.9 | 53.6 | 21.4 | 8.55 |
| 22 | 20 | 11.8 | 53.6 | 21.4 | 17.1 |
| 23 | 20 | 15.3 | 53.6 | 21.4 | 17.1 |
| 24 | 20 | 18.9 | 53.6 | 21.4 | 17.1 |

*Grams per liter.

In runs 1 and 2, the slurry after being removed from the precipitation tank was adjusted with hydrochloric acid to pH 6, filtered, washed and reslurried, whereafter it was adjusted with sodium hydroxide to pH 8, and then filtered, washed, dried and milled.

In runs 3 through 24, the slurry withdrawn from the precipitation tank was treated with hydrochloric acid to adjust it to pH 2, agitated at this pH for 15 minutes and then readjusted by the addition of sodium hydroxide to pH 7. Thereafter, it was aged overnight at 100° C., filtered, washed, dried and micropulverized.

In runs 3 through 18, streams of three solutions were fed to the precipitation tank at points spaced equidistantly from the tank wall and the drive axis of the propeller. The partially neutralized sodium silicate solution was discharged into the tank at a position spaced 180 degrees from the point where the calcium chloride solution was introduced and 90 degrees from the point where the sodium carbonate solution was added.

In runs 19 through 24, the sodium carbonate solution and the calcium chloride solution were introduced into the tank adjacent one another and spaced approximately 180 degrees from the point where the aqueous siliceous solution was added.

In Table IV, the performance in paper (prepared according to the procedure of Example II) of pigments produced according to Example VI is illustrated:

Table IV

| Pigment from Run No.— | Ash weight, percent | Opacity, percent | Brightness, percent | Spig |
|---|---|---|---|---|
| 1 | 9.2 | 85.2 | 87.1 | 0.53 |
| 3 | 6.9 | 83.1 | 88.2 | 0.52 |
| 5 | 7.3 | 83.9 | 85.9 | 0.52 |
| 6 | 7.3 | 84.0 | 86.2 | 0.52 |
| 15 | 6.6 | 82.3 | 87.0 | 0.51 |
| 23 | 6.9 | 83.1 | 89.1 | 0.51 |

Pigmented papers were prepared by the procedure of Example II with the exception that a total of 11.2 grams of pigment (total of siliceous pigments produced according to Example VI and paper pigment grade titanium dioxide). Table V gives pertinent data:

Table V

| Grams of Pigment Used | | Silica from Run No.— | Ash Weight, percent | Opacity, percent | Brightness, percent | Spig | $(S-\bar{s}) \times 10^4$ |
|---|---|---|---|---|---|---|---|
| TiO$_2$ | Silica Pigment | | | | | | |
| 11.2 | --- | --- | 7.1 | 85.7 | 88.9 | 0.78 | 649 |
| 5.6 | 5.6 | 1 | 6.7 | 85.9 | 87.3 | 0.76 | 523 |
| 5.6 | 5.6 | 3 | 6.5 | 85.4 | 89.9 | 0.80 | 531 |
| 5.6 | 5.6 | 5 | 6.4 | 85.8 | 88.6 | 0.77 | 507 |
| 5.6 | 5.6 | 6 | 6.4 | 85.7 | 89.9 | 0.82 | 541 |
| 5.6 | 5.6 | 15 | 6.4 | 85.8 | 88.0 | 0.79 | 520 |
| 5.6 | 5.6 | 18 | 6.2 | 85.5 | 89.0 | 0.82 | 520 |

Sodium carbonate or other source of carbonate ion may be added in procedures other than those exemplified by Example VI. For example, sodium carbonate and sodium silicate may be premixed to form a solution thereof prior to partial neutralization. Example VII illustrates such a modification.

EXAMPLE VII

The general procedure and apparatus described in Example I were followed except that the chloride solution (free from calcium carbonate) was fed at 0.5 liter per minute. The sodium silicate solution contained 20 grams per liter Na$_2$O and the indicated sodium carbonate content. Other streams had the reagent concentrations listed in Table VI.

Table VI

| Run No. | Reagent Concentration in Grams per Liter | | | |
|---|---|---|---|---|
| | Na$_2$CO$_3$ | HCl | CaCl$_2$ | NaCl |
| 1 | 8.55 | 11.8 | 26.8 | 10.7 |
| 2 | 8.55 | 15.3 | 26.8 | 10.7 |
| 3 | 8.55 | 18.9 | 26.8 | 10.7 |
| 4 | 17.10 | 11.8 | 26.8 | 10.7 |
| 5 | 17.10 | 15.3 | 26.8 | 10.7 |
| 6 | 17.10 | 18.9 | 26.8 | 10.7 |
| 7 | 17.10 | 11.8 | 35.7 | 14.7 |

The slurries removed from the precipitation tank were adjusted by acidification with hydrochloric acid to pH 2, agitated for 15 minutes, then readjusted to pH 7 by addition of NaOH, aged overnight at 100° C., filtered, washed, dried and micropulverized. When dispersed in paper these pigments demonstrated effective opacifying properties as indicated by the data in Table VII obtained following the paper making procedure of Example II.

Table VII

| Pigment from Run No.— | Ash Weight, Percent | Opacity, Percent | Brightness, Percent | Spig |
|---|---|---|---|---|
| 1 | 7.0 | 83.3 | 89.8 | 0.52 |
| 4 | 7.0 | 83.1 | 88.7 | 0.49 |

Illustrative chemical and physical characteristics of the pigments of this Example VII are given by the following data for the pigment of run 7:

| | Before Acidification to pH 2 | After Acidification and Readjustment to pH 7 |
|---|---|---|
| SiO$_2$, weight percent | 60.90 | 82.65 |
| CaO, weight percent | 17.81 | 4.02 |
| CO$_2$, weight percent | 9.53 | 1.23 |
| Weight Loss on Ignition at 1000° C., weight percent | 19.70 | 11.01 |
| BET Surface Area Square Meters per Gram | 48 | 76 |

In lieu of the sodium carbonate in Example VII, other water soluble inorganic salts, the anion of which forms a water insoluble salt with an alkaline earth metal such as calcium, such as sodium bicarbonate and water soluble sulfites, carbonates, bicarbonates and sulfates of sodium, potassium and the like are useful, as illustrated by Example VIII.

EXAMPLE VIII

In this example, siliceous pigment was produced duplicating the procedure of Example VII (run 1) replacing the sodium carbonate with sufficient sodium sulfate to provide 22.9 grams per liter thereof in the silicate solution. The slurry of precipitated pigment was finished by water washing on a filter, reslurrying this washed filter cake in sodium carbonate to convert calcium sulfate to calcium carbonate, washing to remove the sodium sulfate, adjusting this slurry with hydrochloric acid to pH 2, then to pH 7.5 with NaOH, filtering, washing, drying overnight at 100° C., and grinding by micropulverizing.

As illustrated in Example VIII, the recovery of pigment from the slurry in which it is formed will vary depending upon the salt or salts present. Thus, the salts, especially but slightly water soluble salts, such as calcium sulfate, are often not conveniently removed by simple water washing. It thus is often expeditious to convert the insoluble salt to one which may be readily soluble or decomposed by acid.

According to a further embodiment hereof, the provision of the carbonate salt, or like salt, in the precipitation medium may be accomplished in connection with other steps involved in the production of the siliceous pigment. In one such particularly appropriate embodiment, the carbonate is provided for in conjunction with and as a consequence of neutralizing partially aqueous sodium silicate or like alkaline metal solution through the use of an acid salt such as sodium bicarbonate as the neutralizing or acidic agent. The net result is that the sodium bicarbonate is converted to sodium carbonate while the sodium silicate is neutralized partially. This aqueous siliceous solution containing dissolved sodium carbonate is then treated with salts such as calcium chloride to precipitate water insoluble siliceous pigmentary materials. Upon acidification (to remove insoluble carbonate) of these precipitates, contemplated siliceous pigments are provided, as illustrated by Example IX.

EXAMPLE IX

In a series of pigment preparations, the general procedure and apparatus described in Example I were followed. In lieu of hydrochloric acid, however, aqueous sodium bicarbonate solutions (containing the specified concentrations of NaHCO$_3$) were used and the aqueous chloride salt solution (without carbonate) was constituted as reported in Table VIII. Thus, the source of carbonate present in the precipitation tank was the sodium bicarbonate.

Table VIII

| Run No. | Grams per Liter | | | |
|---|---|---|---|---|
| | Sodium Silicate $Na_2O$ | $NaHCO_3$ | Chloride $CaCl_2$ | Solution NaCl |
| 1 | 30 | 48.6 | 107 | 43 |
| 2 | 30 | 48.6 | 107 | 43 |
| 3 | 20 | 8.2 | 23.2 | 9.6 |
| 4 | 20 | 13.6 | 23.2 | 9.6 |
| 5 | 20 | 21.7 | 23.2 | 9.6 |
| 6 | 20 | 8.2 | 28.6 | 11.6 |
| 7 | 20 | 13.6 | 28.6 | 11.6 |
| 8 | 20 | 21.7 | 28.6 | 11.6 |
| 9 | 20 | 8.2 | 44.7 | 17.9 |
| 10 | 20 | 13.6 | 44.7 | 17.9 |
| 11 | 20 | 21.7 | 44.7 | 17.9 |

In runs 1 and 2, the solution of calcium chloride and sodium chloride was fed at the rate of 0.5 liter per minute with the calculated time before contact with the tank contents being 0.02 second rather than 1.0 liter per minute and 0.13 second as in Example I and runs 3 to 11. In run 1, the slurry was aged overnight at 100° C., then adjusted with HCl to pH 2, agitated for 15 minutes and then readjusted with NaOH to pH 7-8 before filtering, washing and drying. In run 2, the slurry was promptly adjusted to pH 2 and thereafter finished as in run 1, except that it was aged overnight at 100° C. after being readjusted to pH 7.3 and prior to filtering. Runs 3 to 11 were finished as run 2, except that the readjustment was to pH 7.5.

Pigments produced in this Example IX are useful for imparting enhanced optical properties (opacity and brightness) to paper. They also are useful rubber reinforcing pigments. Table IX tabulates the performance in paper prepared according to the procedure described in Example II. Example X and Table X demonstrate their rubber reinforcing properties.

Table IX

| Pigment from Example IX, Run No.— | Ash Weight, Percent | Opacity, Percent | Brightness, Percent | Spig |
|---|---|---|---|---|
| 1* | 5.3 | 80.6 | 85.1 | 0.49 |
| 7 | 7.6 | 82.2 | 88.7 | 0.46 |
| 8 | 7.0 | 83.6 | 89.8 | 0.54 |

*In Run 1 only 9.9 grams of pigment was added to 140 grams of pulp. This is a 7.1 weight percent pigment loading rather than the normally used 10 weight percent loading and accounts for the lower ash.

EXAMPLE X

The pigment of run 2, Example IX, was compounded in the following GR–S rubber recipe:

|  | Parts by weight |
|---|---|
| GR–S–1000 | 100.0 |
| ZnO | 5.0 |
| Sulfur | 3.0 |
| Phenyl betanaphthylamine | 1.0 |
| Altax (dibenzothioxyl disulfide) | 1.2 |
| Methyl Tuads (tetramethyl thiuram disulfide) | 0.15 |
| Cumar MH 2½ (coumarin-indene resin) | 15.0 |
| Diethylene glycol | 3.5 |
| Pigment | 58.5 |

This rubber composition was subjected to various curing times at 280° F. and then tested according to standard procedures with these results:

Table X

| Minutes Cure at 280° F. | Modulus | | | Tensile Pounds per Square Inch | Percent Elongation | Durometer Hardness, 30" | Tear Pounds Per Inch Thickness |
|---|---|---|---|---|---|---|---|
| | 100% | 300% | 500% | | | | |
| 15 | 280 | 900 | 2,110 | 2,460 | 540 | 54 | 180 |
| 20 | 310 | 930 | 2,160 | 2,640 | 550 | 55 | 180 |
| 30 | 270 | 890 | 2,000 | 2,000 | 500 | 56 | 170 |
| 45 | 330 | 930 | 2,100 | 2,320 | 520 | 58 | 170 |
| 60 | 270 | 890 | 1,950 | 2,220 | 530 | 58 | 170 |
| 90 | 270 | 880 | 1,950 | 2,180 | 520 | 57 | 170 |

In lieu of acid salts such as sodium bicarbonate which serve the duel function of neutralizing the aqueous alkali metal silicate and also providing the source of carbonate or other appropriate ions, other acid salts are of use. These include potassium bicarbonate, sodium bisulfite and the like.

EXAMPLE XI

A solution containing 10.7 grams per liter $SO_2$ was prepared by slowly adding 194 grams of concentrated hydrochloric acid to a solution of 122 grams $Na_2SO_3$ in 4 liters of water. This solution was employed in lieu of the sodium bicarbonate solution in Example IX to neutralize partially a sodium silicate solution containing 20 grams per liter $Na_2O$ and pigment was prepared therefrom according to the procedure of Example IX. The solution of chloride salts used in this preparation contained 26.8 grams per liter $CaCl_2$ and 11.6 grams per liter NaCl.

From the foregoing examples, it is clear various procedures and reagents are of use in preparing valuable siliceous pigments. Any suitable water soluble alkali metal silicate, for example, serves as a source of the $SiO_2$ content of the ultimate pigment. Sodium silicate containing from 2 to 4 moles $SiO_2$ per mole of $Na_2O$ is the more widely available and used material. Others, including potassium silicate, lithium silicate and sodium potassium silicate containing from 1 to 5 moles of $SiO_2$ per mole of alkali metal oxide, however, function.

The salt which functions to induce precipitation of water insoluble siliceous material also can be one of many. It is usually preferable the salt to be a water soluble halide, notably a chloride, such as calcium chloride, the cation of which forms a water insoluble silicate. Among the salts which may be used there are the following: sodium chloride; barium chloride; strontium chloride; zinc chloride; calcium bromide; sodium iodide; water soluble metal salts of strong acids (e.g., acids having an ionization constant of at least $1 \times 10^{-2}$) such as metal nitrates illustrated by calcium nitrate and sodium nitrate; metal sulfates such as sodium sulfate.

As with other reagents, there is considerable latitude in the acidic material employed in the partial neutralization of the aqueous solution of alkali metal silicate. Acids such as hydrochloric acid, sulfuric acid, nitric acid, acetic acid, sulfurous acid, phosphoric acid and carbonic acid (or their anhydrides) are included. In the main, preference is for acidic materials, the anions of which do not form water insoluble materials under the prevailing conditions with alkali metals. Useful acidic materials, as hereinbefore demonstrated, include acid salts such as sodium bicarbonate which perform a dual function.

Many acids (or acidic materials) are effective in treating the slurry of precipitated water insoluble siliceous material for the purpose of water solubilizing water insoluble non-siliceous material such as calcium carbonate. Most normally, these acids are those which upon reaction with such water insoluble material will provide either a water soluble salt and/or will result in generating an anhydride of the water insoluble material such as carbon dioxide when the material is calcium carbonate. For this purpose, strong mineral acids such as hydrochloric, nitric and phosphoric acids are recommended.

In all the various steps of the methods herein described there are, of course, ideal conditions of pressure, temperature, reagent concentration and the like. For the most part, the examples demonstrate the better and/or recommended conditions. Thus, recourse to pressures other than substantially atmospheric is unnecessary, although sub- or superatmospheric pressures are operable.

Conditions under which the partially neutralized siliceous solutions are prepared and under which the siliceous content thereof is transformed into water insoluble siliceous precipitate of pigmentary character are in the main as described hereinbefore. They are also described in an earlier application Serial No. 811,183, filed May 5, 1959, the relevant disclosure of which is herein incorporated by reference.

While the invention has been described in greatest detail in terms of specific details of certain embodiments, it is to be understood that the invention is not intended to be limited to such details except insofar as they appear in the appended claims.

I claim:

1. Finely divided siliceous pigment comprised of porous flocs of ultimate particles and having an average ultimate particle size of greater than 0.01 micron and below 0.3 micron, said pigment being characterized by ultimate particles which are in the form of an optically dense outer shell of water insoluble siliceous material and an interior volume of an optical density substantially lower than said outer shell, said optically less dense interior volume being substantially free of water insoluble precipitated siliceous material.

2. Finely divided siliceous pigment comprised of porous flocs of ultimate particles and having an average ultimate particle size of below 0.5 micron, said pigment being characterized by ultimate particles which are in the form of an optically dense outer shell of water insoluble siliceous material and an interior volume of an optical density substantially lower than said outer shell, said optically less dense interior volume being substantially free of water insoluble solid.

3. Finely divided siliceous pigment comprised of porous flocs of ultimate particles and having an average ultimate particle size of below 0.5 micron, said pigment being characterized by ultimate particles which are in the form of an optically dense outer shell of water insoluble siliceous material and an interior volume of an optical density substantially lower than said outer shell, said interior volume being substantially free of water insoluble precipitated siliceous material.

4. Finely divided siliceous pigment comprised of porous flocs of ultimate particles and having an average ultimate particle size greater than 0.01 micron but below 0.3 micron, said pigment being characterized by ultimate particles in the form of an optically dense outer shell structure of water insoluble siliceous material and an interior volume within the shell structure, substantially free of water insoluble precipitated siliceous material and of an optical density substantially lower than the shell, and wherein the thickness of said shell is a fraction of the average ultimate particle size and is from 0.001 to 0.15 micron.

5. Finely divided siliceous pigment comprised of porous flocs of ultimate particles having an average ultimate particle size of from 0.01 to 0.3 micron, said pigment being characterized by ultimate particles in the form of an outer shell structure of water insoluble siliceous material and an interior volume within this shell structure substantially free of water insoluble siliceous material and wherein the thickness of this shell structure is between $\frac{1}{20}$ and $\frac{1}{4}$ the average ultimate particle size.

6. The pigment of claim 5 wherein the shell is discontinuous.

7. Paper having distributed therein finely divided siliceous pigment comprised of porous flocs of ultimate particles and having an average ultimate particle size of below 0.5 micron, said pigment being characterized by ultimate particles which are in the form of an optically dense outer shell of water insoluble siliceous material and an interior volume substantially free of water insoluble precipitated siliceous material and of an optical density substantially lower than said outer shell.

8. Paper of claim 7 wherein the siliceous pigment content is 0.5 to 5 percent by weight of its pulp content.

9. Paper having distributed therein finely divided siliceous pigment comprised of porous flocs of ultimate particles and having an average ultimate particle size greater than 0.01 micron but below 0.3 micron, said pigment being characterized by ultimate particles in the form of an optically dense outer shell structure of water insoluble siliceous material and an interior volume within the shell structure substantially free of water insoluble precipitated siliceous material and of an optical density substantially lower than the shell, and wherein the thickness of said shell is a fraction of the average ultimate particle size and is from 0.001 to 0.15 micron.

10. Paper having distributed therein finely divided siliceous pigment comprised of porous flocs of ultimate particles having an average ultimate particle size of from 0.01 to 0.3 micron, said pigment being characterized by ultimate particles in the form of an outer shell structure of water insoluble siliceous material and an interior volume within this shell structure substantially free of water insoluble siliceous material and wherein the thickness of this shell structure is between $\frac{1}{20}$ and $\frac{1}{4}$ the average ultimate particle size.

11. Paper having distributed therein titanium dioxide and finely divided siliceous pigment comprised of porous flocs of ultimate particles and having an average ultimate particle size of below 0.5 micron, said pigment being characterized by ultimate particles which are in the form of an optically dense outer shell of water insoluble siliceous material and an interior volume substantially free of water insoluble precipitated siliceous material and of an optical density substantially lower than said outer shell.

12. Paper having distributed therein titanium dioxide and finely divided siliceous pigment comprised of porous flocs of ultimate particles having an average ultimate particle size of from 0.01 to 0.3 micron, said pigment being characterized by ultimate particles in the form of an outer shell structure of water insoluble siliceous material and an interior volume within this shell structure substantially free of water insoluble siliceous material and wherein the thickness of this shell structure is between $\frac{1}{20}$ and $\frac{1}{4}$ the average ultimate particle size.

13. In the method of preparing siliceous pigment by inducing with metal salt the precipitation of water insoluble siliceous material from an aqueous siliceous solution which itself would normally tend to precipitate siliceous material, the improvement which comprises effecting so induced precipitation in a slurry of finely divided water insoluble salt and thereafter removing said insoluble salt.

14. The method of claim 13 wherein the slurry of finely divided water insoluble salt is a slurry of calcium carbonate having an average ultimate particle size of from 0.01 to 0.25 micron.

15. The method of claim 13 wherein said slurry of finely divided water insoluble salt is provided by slurrying the finely divided insoluble salt in water.

16. The method of claim 13 wherein said slurry of finely divided water insoluble salt is provided by feeding in water soluble form sources of ions which form said water insoluble salt.

17. In the method of preparing siliceous pigment by inducing with metal salt the precipitation of water insoluble siliceous material from an aqueous siliceous solution which itself would normally tend to precipitate siliceous material, the improvement which comprises effecting so induced precipitation in a slurry of finely divided water insoluble salt whereby to form a slurry of water insoluble preciptated siliceous material and said water insoluble salt and thereafter reacting said slurry with an acid to convert the anion of said insoluble salt into a water soluble material.

18. In the method of preparing siliceous pigment which involves forming an aqueous precipitating medium from an aqueous siliceous solution which itself normally tends to precipitate siliceous material and precipitating water insoluble siliceous material from said medium with water soluble metal salt, the improvement which comprises including in the medium finely divided water insoluble salt whereby to form a slurry which includes water insoluble precipitated siliceous material and water insoluble salt, and thereafter separating water insoluble salt from precipitated siliceous material.

References Cited in the file of this patent

UNITED STATES PATENTS

| | | |
|---|---|---|
| 2,786,758 | Taylor | Mar. 26, 1957 |
| 2,935,437 | Taylor | May 3, 1960 |
| 2,943,970 | Allen | July 5, 1960 |
| 2,943,971 | Taylor | July 5, 1960 |
| 3,034,913 | Lagerstrom | May 15, 1962 |
| 3,034,914 | Lagerstrom | May 15, 1962 |